April 8, 1958
C. M. GARNER ET AL
2,829,860
ELECTROMAGNETIC VALVE
Filed June 10, 1954
2 Sheets-Sheet 2
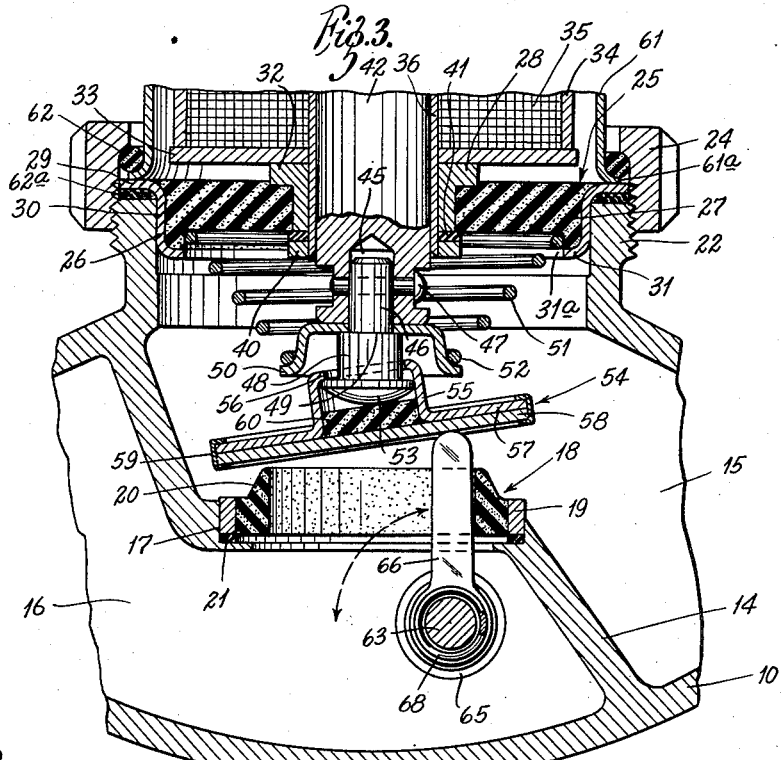
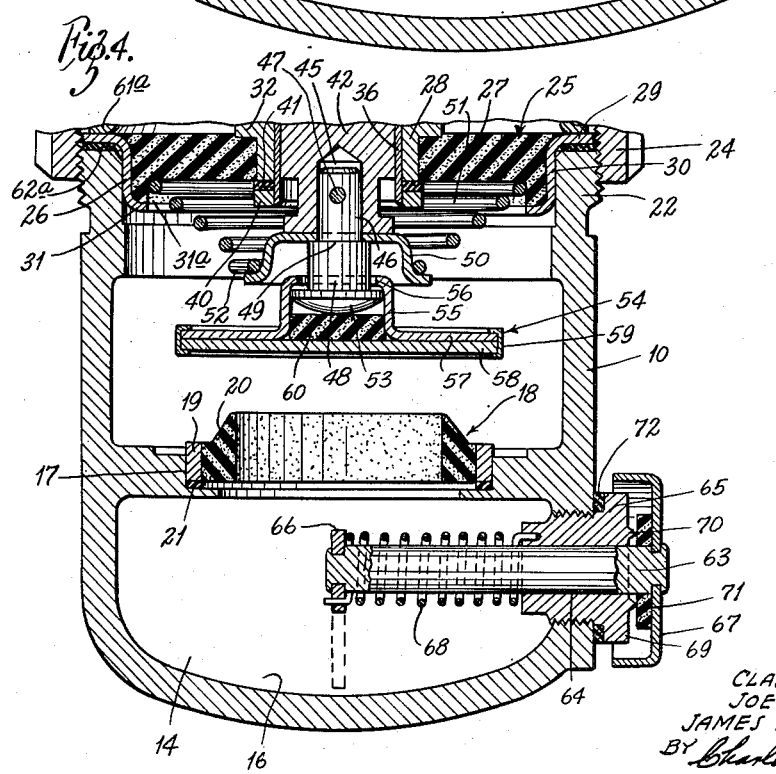
INVENTORS
CLAUDE M. GARNER
JOE ROOS JR.
JAMES A. WRIGHT
BY Charles E. Markham
THEIR AGENT

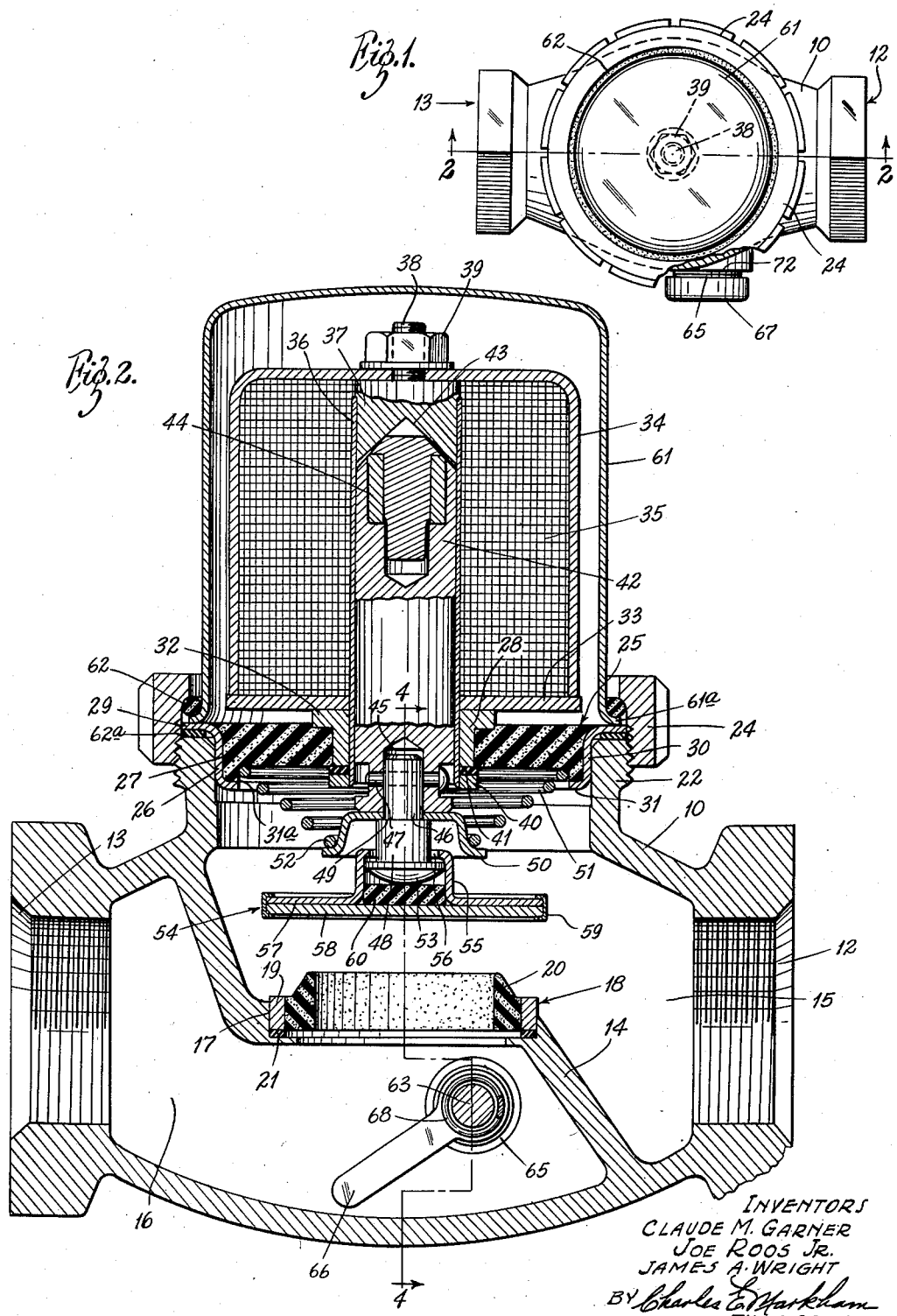

2,829,860

ELECTROMAGNETIC VALVE

Claude M. Garner, Clayton, Joe Roos, Jr., St. Louis, and James A. Wright, Webster Groves, Mo., assignors, by mesne assignments, to White-Rodgers Company, a corporation of Delaware Application June 10, 1954, Serial No. 435,866

14 Claims. (Cl. 251—129)

This invention relates to solenoid actuated valves and particularly to means for resiliently mounting the solenoid actuator on the valve so as to prevent the transmission of solenoid plunger impact noises to the valve housing and connected piping.

It is an object of the invention to provide a generally new and improved A. C. operated solenoid valve which is particularly efficient and noiseless in operation.

A further object is to provide a solenoid operated gas valve in which the solenoid actuator is resiliently mounted on the valve body in such manner as to substantially preclude the transmission of all solenoid impact noise to the valve body and yet be maintained in correct operative relationship with the valve body at all times.

These and other objects and advantages which appear from the following description and accompanying drawings are attained in the present invention.

In the drawings:

Fig. 1 is a plan view of a solenoid valve constructed in accordance with the present invention;

Fig. 2 is an enlarged, vertical, cross-sectional view taken on line 2—2 of Fig. 1;

Fig. 3 is a fragmentary view showing the lower portion of Fig. 2 with the valve being held open by the self-tripping, manual operating device;

Fig. 4 is a fragmentary cross-sectional view of the lower portion of the valve taken on line 4—4 of Fig. 2.

Referring more particularly to the drawings, the device includes a valve body 10, having an inlet 12, an outlet 13, and a partition 14 defining an inlet chamber 15 and an outlet chamber 16. The partition has a counterbored port 17 therethrough into which is press fitted a valve seat assembly 18. The valve seat assembly comprises a short metal cylinder 19 and a circular synthetic rubber seat element 20. The seat element is formed by molding the synthetic rubber in the metal cylinder 19, and it is firmly bonded at its periphery to the inner wall of cylinder 19.

The valve seat assembly is spaced from the bottom of the counterbore by a relatively narrow ring gasket 21. The arrangement is such that the rubber seat element 20 is supported only at its periphery at which it is bonded to the ring 19 so that, when a rapidly closing valve engages its upper surface, the impact is not transmitted through compression to the valve body. The stress set up in the element 20 is, on the other hand, a shearing stress and the impact of the valve is effectively dampened. The seat element 20 is preferably constructed of a Buna-N base synthetic rubber having a Shore Durometer hardness of between 40 and 45. The sealing gasket 21, while being pliable, is preferably constructed of a more rigid material than element 20.

The upper portion of valve body 10 has a circular hollow extension 22 which is externally threaded to receive a circular nut 24. Supported on the upper face of the body extension 22 and rigidly attached thereto by the circular nut 24, is a circular support member generally indicated at 25. The circular support member 25 comprises a formed outer metal ring member 26, a relatively thick, pliable and resilient disc member 27, and a central flanged collar member 28 of magnetic material. The resilient disc member 27 is also preferably constructed of a Buna-N synthetic rubber with a Shore Durometer hardness of between 40 and 45, and the entire circular support member is formed by molding the synthetic rubber into the outer ring and by placing the central collar as an insert in the mold so that the resilient disc member is firmly bonded to the central collar 28 and to the ring member 26. The ring member 26 is formed so as to have an upper, outwardly turned flange portion 29 which is clamped between the nut 24 and valve body extension 22, a vertical wall portion 30 to which the resilient disc member 27 is bonded, and a lower, inwardly turned flange portion 31, the inner edge of which defines a lower circular recess 31a in the support member which has a purpose to be described.

The central magnetic collar member is slightly longer than the thickness of the resilient disc and projects upwardly somewhat from the surface thereof and has an upper flange portion 32 formed thereon. Resting on the upper flange surface of the central collar member 28 is a circular, centrally perforated base member 33 of magnetic material which, together with an inverted cup-shaped member 34 of magnetic material, forms a casing and an external flux path for a solenoid winding 35. A solenoid plunger guide sleeve 36 of non-magnetic metal passes through the perforated base member 33 and the central collar 32 at its lower end and extends upwardly to a point near the bottom of the inverted cup member 34. Entered into the upper end of the sleeve member 36, and fixed therein as by soldering, is a short cylindrical plunger stop member 37 of magnetic material which bears at its upper end against the bottom of cup member 34. Stop member 37 has an upwardly extending, threaded stud portion 38 which projects through a central perforation in the bottom of cup member 34 and receives a nut 39, and the lower end of guide sleeve 36, which projects through the collar 32, is provided with a flange 40 so that when the nut is tightened the solenoid winding and casing are firmly attached to the central collar member 32 by the guide sleeve 36. A suitable pliable ring washer 41 is provided between the guide sleeve flange 40 and the lower end of the central collar member.

Loosely fitted in the guide sleeve 36 is a solenoid plunger 42. The upper end of the plunger is formed with a frusto-conical point which cooperates with a conical recess 43 in the lower end of the magnetic stop member 37 to center the upper end of the loosely fitted plunger in its guide sleeve. The plunger is also provided at its upper end with a shading ring 44 for the purpose of shifting the phase of a portion of the flux when the device is operated by alternating current so that a constant magnetic holding force is achieved. The portion of phase shifted flux is determined by an outer annular air gap between the peripheral portion of the plunger and the stop member, which is provided by making the included angle of the frusto-conical point of the plunger somewhat less than the included angle of the conical recess in the stop member 37. This feature and its advantages are more fully set forth in the co-pending application of common assignee for an "Electromagnetic Valve," Serial Number 383,842, filed October 2, 1953.

At its lower end the plunger 42 has a longitudinal bore 45 which receives one end of a valve stem 46 which is retained in the plunger bore by a cross pin 47. The stem 46 is provided with an enlarged diameter portion 48 and a shoulder 49 which holds a spring retainer 50 against the lower end of the plunger. The retainer 50 has a horizontal flange portion against which bears the lower, smaller end of a conically wound spring 51.

Spring 51 is provided with an end loop 52 at its lower small end which is formed eccentrically to the remainder of the spring and which snugly fits the retainer 50 so as to cause the lower end of the loosely fitted plunger to be biased laterally against one side of its guide sleeve. The upper end of spring 51 is retained in the circular recess 31a which is concentric with the guide sleeve. This arrangement is more fully shown and described in Patent No. 2,650,617, issued September 1, 1953, to Joseph A. Wasser. This provision eliminates lateral chattering of the lower end of the plunger against the wall of its guide sleeve with A. C. current reversals.

The exterior end of valve stem 46 is provided with a rounded head 53 on which is loosely supported a valve generally indicated at 54. Valve 54 comprises an inverted cup-shaped member 55 having a central perforation 56 which loosely fits the enlarged portion 48 of the valve stem and having a wide flange portion 57 against the lower surface of which is positioned in face to face relationship a flat metal disc 58. The disc 58 is attached to the flange 57 by a formed peripheral band member 59. It will be noted that, due to the loose fit of the cup member 55 on the valve stem, the valve may swivel freely within limits and that the depth of the cup portion provides a space between the valve head 53 and the disc member 58. A sponge rubber disc member 60, bonded to the upper surface of disc member 58, eliminates the impact noise of metal-to-metal contact as the plunger falls and the valve is seated. The thickness of rubber disc member 60, plus the thickness of the valve stem head 53, are, however, less than the depth of the cup 55 so that some free space or lost motion remains to permit the solenoid plunger to start free when energized so as to exert a "hammer blow" to the valve.

Enclosing the entire actuating mechanism is an inverted, cup-shaped, outer casing member 61 spaced from the walls of the inner casing 34. The cup-shaped, outer casing 61 is provided at its rim with an outwardly formed flange portion 61a which, together with the flange portion 29 of the support ring, is clamped between the nut 24 and the valve body extension 22. Suitable pliable ring gaskets 62 and 62a respectively are provided between the nut and the outer casing and between the support ring and the valve body extension.

A self-releasing, manually operated means is provided for manually opening the valve in event of power failure. The means comprises a horizontal shaft 63 which is journalled in a longitudinal bore 64 in a screw threaded plug member 65. The shaft 63 extends inwardly and exteriorly of the valve body 10. The plug 65 is received in a threaded opening in the side of the valve body. At its inner end shaft 63 carries fixed thereto an arm 66 which, when the shaft 63 is rotated, engages the valve 54 to lift it from its seat to an open position, as shown in Fig. 3. The exteriorly projecting end of the shaft 63 is provided with a cup-shaped member 67 fixed thereto which forms a turning knob. The shaft 63 is normally biased rotationally in a counter-clockwise direction, with reference to Fig. 2, by a spring 68 fastened at one end to the plug 65 and at its other end to arm 66, so that the arm 66 is normally resting against the bottom of the valve body as indicated in this figure. The plug 65 has an external head portion 69 on the outer face of which is formed a narrow annular concentric seat 70 against which bears a relatively soft synthetic rubber sealing disc 71. The sealing disc 71 is tightly fitted over the shaft 63 so as to preclude any leakage, and the spring 68, besides being stressed torsionally so as to normally retain the arm 66 in the aforesaid position, is also tensionally stressed between its connected ends so that the sealing disc 71 is constaitly held against the seat 70. A suitable pliable sealing gasket 72 is also provided between the plug head and the valve body. While we prefer to employ the means above described for manually opening the valve in event of power failure, any other suitable means may be employed inasmuch as this device is not a part of the present invention.

*Operation*

The device is shown in Fig. 2 in an energized position with the valve in a fully open position and with the plunger centered in the sleeve at its upper end and held in an attracted position against its stop member and held at its lower end against one side of the sleeve by the eccentric spring 51. When the device is de-energized, the relatively heavy plunger and valve assembly falls, with some assistance from spring 51, thereby closing the valve. The impact between the head 53 of the valve stem and the valve is absorbed by the sponge rubber washer 60, and the impact between the valve and the valve seat is absorbed in the mass of the material of which the seat is constructed.

Inasmuch as it is desirable that the material of which the valve seat is constructed has sufficient rigidity to prevent excessive deformation under the weight of the valve and plunger assembly, and inasmuch as any material having the desired rigidity has been found by experimentation to transmit an objectionable amount of valve impact noise when under direct compression, applicant has provided the novel arrangement of mounting the valve seat so that the pliable and resilient material of which it is constructed is subjected to a shearing stress rather than a compression stress. It will be readily appreciated that any valve impact noises transmitted to the valve body are greatly amplified in any metal piping which in use may be directly connected to the valve body, and because of this, it is highly desirable to effectively dampen such noises as completely as possible.

If when the device is in a de-energized, valve closed position the winding 35 is energized, the plunger will move rapidly upward. In a short initial portion of its upward movement, the plunger travels free of the valve until the valve stem head 53 engages the bottom of cup member 55 at which time the valve receives an upward blow which acts to dislodge the valve in event it tends to stick closed. By the time the plunger reaches its upward limit of travel, it has attained considerable velocity, and being of relatively heavy, magnetic material, it strikes its stop member 37 with considerable impact. Upon referring to Fig. 2, it will be seen that the entire solenoid actuator assembly is spaced from the valve body and supported, when energized, by the pliable, resilient disc member 27, and that the character of the material and the construction of disc 27 is such that it effectively absorbs the impact noise of the upwardly traveling plunger and yet retains the actuator assembly in aligned and correct operative position.

It is to be understood that the valve seat 20 may be of composite construction with a portion thereof adapted to be engaged by the valve being constructed of a more rigid material than the attaching portion thereof, and that means for attaching the support disc 27 at its periphery or for attaching the valve seat at its periphery other than by vulcanizing or heat bonding, as described, may be applied by those skilled in the art without departing from the spirit of the invention.

It will be seen that while the opening in the top of the valve body formed by hollow extension 22 is completely sealed by the circular support member 25, it is also further completely sealed by the overlying inverted cup-shaped outer casing 61. The provision of outer casing 61 permits the use of any of a number of forms of otherwise suitable resilient connections between the solenoid actuator and the valve body which would not provide a seal for the opening. Further, the preferred described resilient disc 27, while providing a complete seal under all normal conditions of operation, could conceivably soften in event of a fire to the extent at least that gas could escape from the valve body into the surrounding area of conflagration were it not for the outer casing 61.

If the source of electrical energy for operating the device fails and it is desired to open the valve to supply fuel during this lapse of power, the knob 67 is rotated by hand, causing the end of arm 66 to engage the valve and lift it from its seat. It will be noted, referring to Fig. 2, that the center line of shaft 63 lies to the right of the center line of the valve, so that when the arm is rotated to the position shown in Fig. 3, the valve, being swivel mounted, will incline. The inclination of the swivel mounted valve and the weight of the plunger is sufficient to hold the arm in this position against the torsional force of spring 68 so that the valve remains held in an open position when the knob 67 is released. It will be further understood that the length of arm 66 is not great enough to move the valve to a fully open position with the upper end of plunger 42 against its stop member, so that if when the valve is being held open by the arm 66 the source of electrical power is restored, the plunger and valve will be moved further upward, thereby releasing the arm so that it will be returned to its normal inoperative position by spring 68.

The foregoing description and drawings disclose one form of the present invention, the scope of the invention being set forth in the appended claims.

We claim:

1. In a solenoid operated gas valve for use in domestic heating service, a valve body having a reciprocating valve therein, a solenoid actuator comprising a winding and a reciprocating plunger, means for resiliently mounting said actuator exteriorly on said valve body, and said plunger extending interiorly through an opening in said body and having an operative connection with said valve.

2. In a solenoid operated gas valve for use in domestic heating service, a valve body having a reciprocating valve therein, a solenoid actuator comprising a plunger guide sleeve, a winding surrounding said guide sleeve, and a reciprocating plunger in said guide sleeve, means for mounting said actuator on said valve body comprising a resilient member connecting said guide sleeve with said valve body, and said plunger extending into said valve body through an opening therein and having an operative connection with said valve.

3. In a solenoid operated gas valve for use in domestic heating service, a valve body having a reciprocating valve therein and having an opening in one wall thereof, a solenoid valve actuator mounted exteriorly of said body comprising a plunger guide sleeve having an open end adjacent said body opening, a winding surrounding said sleeve, a casing of magnetic material enclosing said winding, and a reciprocating plunger in said guide sleeve having a projecting end extending into said valve body and having an operative connection with said valve, resilient means connecting said actuator guide sleeve with said valve body, and a casing detachably connected to said valve body and enclosing said actuator and said opening in said body.

4. In a solenoid operated gas valve for use in domestic heating service, a valve body having a reciprocating valve therein and an opening in the wall thereof concentric with said valve, a solenoid actuator mounted exteriorly of said valve body and adjacent said opening, said actuator comprising a casing of magnetic material, a winding in said casing, a central plunger guide sleeve concentric with said opening in said valve body, and a reciprocating plunger in said sleeve extending into said valve body and having an operative connection with said valve, resilient means connecting said actuator to said valve body, and an outer casing attached to said valve body and enclosing said actuator and said opening in said valve body.

5. In a solenoid gas valve for use in domestic heating service, a valve body, a valve seat in said body, a reciprocating valve in said body cooperating with said seat, an opening in a wall of said valve body concentric with said seat, a resilient disc closing said opening and being attached at its periphery to the rim defining said opening, said disc having a central perforation, a solenoid actuator arranged exteriorly of said body and having a projecting plunger guide sleeve member extending into said central disc perforation and being rigidly attached to said disc, and a solenoid plunger in said guide sleeve and extending into said valve body and having an operative connection with said valve.

6. In a solenoid gas valve for use in domestic heating service, a valve body, a valve seat in said body, a valve in said body cooperating with said seat, an opening in the wall of said body concentric with said valve seat, a centrally perforated disc of pliable material closing said opening and being attached at its periphery to said valve body, an exteriorly mounted solenoid actuator having a central plunger guide sleeve member concentric with said central disc perforation, and a plunger member in said guide sleeve and extending through said disc perforation into said valve body and having an operative connection with said valve, means for attaching said actuator to the central portion of said pliable disc, and a casing attached to said body enclosing said actuator and said valve body opening.

7. In a solenoid gas valve for use in domestic heating service, a valve body having an interior fluid port therein, a pliable valve seat in said port supported only at its periphery, a reciprocating valve in said body arranged to engage one face of said valve seat, an opening in the wall of said valve body concentric with said valve seat, an exteriorly positioned solenoid valve actuator having a plunger guide sleeve concentric with said opening, a reciprocating solenoid plunger slidably carried in said guide sleeve and projecting through said valve body opening and having an operative connection with said valve, means for resiliently mounting said solenoid actuator externally on said valve body, and a casing attached to said valve body enclosing said solenoid actuator and surrounding and enclosing said valve body opening.

8. In a solenoid gas valve for use in domestic heating service, a valve body having an interior port therein, a valve seat of relatively soft, pliable material in said port and supported only at its periphery, a reciprocating valve in said body engaging one face of said seat, an opening in a wall of said valve body concentric with said valve seat, a centrally perforated disc of relatively soft, pliable material fitted in said valve body opening and attached at its periphery to said valve body, and a solenoid valve actuator mounted on the exterior face of said disc having a plunger guide sleeve concentric with the disc perforation, a reciprocating plunger in said sleeve having a projecting end extending through said disc perforation and having an operative connection with said valve, and said solenoid actuator being attached to the central portion of said pliable disc and being spaced from the remainder of said disc.

9. In a solenoid actuator, a casing, a winding in said casing, a central plunger guide sleeve member mounted in said casing and having a portion thereof projecting through one end wall of said casing, and mounting means for said actuator adjacent said end wall, said mounting means comprising a resilient disc of pliable material, said disc having a central, rigid, sleeve member for receiving said projecting plunger guide sleeve portion, a central annular spacer on one face of said disc surrounding said rigid sleeve member for spacing said casing end wall from said face of said disc, and said projecting guide sleeve portion extending through said disc and having a flange at the projecting end thereof for clamping said disc to said casing.

10. In a solenoid actuator, a casing, a winding in said casing, a central plunger guide sleeve member slidably mounted in said casing, said sleeve member having one closed end adapted to abut the inside of one end wall of said casing and having a threaded stud portion thereon extending exteriorly through an aperture in said casing wall, the other end of said sleeve member projecting through the opposite end wall of said casing, a resilient actuator mounting member comprising an elastic disc of pliable material adjacent said opposite end wall of said casing, said pliable disc having a rigid, peripheral, mounting flange and a central perforation for receiving said projecting end of said guide sleeve, said projecting end of said guide sleeve extending through said disc, a rigid central annular spacing member extending through said disc and means for clamping said disc to said casing end wall including a flange carried on said projecting end of said guide sleeve and a nut on said threaded stud portion at the other end of said guide sleeve.

11. The construction claimed in claim 10 in which said elastic mounting disc is constructed of a relatively soft, Buna–N base, synthetic rubber and is sufficiently thick to support the weight of the actuator when at rest with negligible deflection.

12. In a solenoid actuator, a casing of magnetic material, a winding in said casing, a centrally disposed plunger guide sleeve of non-magnetic material in said casing having a portion at one end thereof projecting externally through one end wall of said casing, a reciprocating plunger of magnetic material slidably arranged in said guide sleeve, a relatively thick, pliable and resilient mounting disc of non-magnetic material adjacent said end wall of said casing, said resilient mounting disc having a centrally arranged sleeve member of magnetic material extending therethrough, said projecting plunger guide sleeve portion being received in and extending through said magnetic sleeve member and carrying means on the end thereof for clamping said pliable disc to said end wall of said casing, and said magnetic sleeve member having a flange portion at one end thereof in face to face contact with said end wall of said casing.

13. In a solenoid gas valve for use in domestic heating service, a valve body having a reciprocating valve therein, a solenoid actuator having a casing and having a projecting reciprocating plunger entering said valve body and being operatively connected to said valve, and means for mounting said actuator on said body comprising a thick, relatively soft, synthetic rubber disc arranged concentric with said plunger and being connected at its center portion to said actuator casing and at its periphery to said valve body.

14. In a solenoid gas valve for use in domestic heating service, a valve body, a valve port in said body, a valve seat in said port comprising a synthetic rubber annulus supported at its periphery in said port, a reciprocating valve in said body cooperating with said seat, a solenoid actuator having a casing, a winding, and a reciprocating plunger slidably mounted therein, said plunger extending into said body through an opening therein and being operatively connected to said valve, positive stop means in said casing for limiting the inward travel of said plunger, resilient means for mounting said actuator casing on said valve body comprising a thick, pliable, synthetic rubber disc arranged concentrically with said plunger and being connected at its central portion to said actuator casing and at its periphery to said valve body, and an outer casing connected to said valve body and enclosing said actuator, said resilient connection and the opening in said valve body.

References Cited in the file of this patent

UNITED STATES PATENTS

| | | |
|---|---|---|
| 148,558 | Goble | Mar. 17, 1874 |
| 606,867 | Hoover | July 5, 1898 |
| 806,331 | Ferry | Dec. 5, 1905 |
| 1,424,094 | Gunn | July 25, 1922 |
| 2,020,092 | Allen | Nov. 5, 1935 |
| 2,111,232 | Wetzel | Mar. 15, 1938 |
| 2,187,950 | Nulsen | Jan. 23, 1940 |
| 2,238,401 | Shaw | Apr. 15, 1941 |
| 2,348,548 | Koehler | May 9, 1944 |
| 2,399,517 | Spitler | Apr. 30, 1946 |
| 2,434,096 | Ayers | Jan. 6, 1948 |
| 2,547,257 | Cole | Apr. 3, 1951 |
| 2,565,697 | Odstrcil | Aug. 28, 1951 |
| 2,620,151 | Peters | Dec. 2, 1952 |
| 2,650,617 | Wasser | Sept. 1, 1953 |
| 2,735,047 | Garner | Feb. 14, 1956 |